(12) United States Patent
Rajashekar et al.

(10) Patent No.: US 11,386,051 B2
(45) Date of Patent: Jul. 12, 2022

(54) AUTOMATIC INTELLIGENT HYBRID BUSINESS INTELLIGENCE PLATFORM SERVICE

(71) Applicant: SAP SE, Walldorf (DE)

(72) Inventors: Ashok Rajashekar, Bangalore (IN); Narendra Bobba, Bangalore (IN); Ravi Sekhar Reddy Karri, Bangalore (IN)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 16/697,545

(22) Filed: Nov. 27, 2019

(65) Prior Publication Data
US 2021/0157774 A1 May 27, 2021

(51) Int. Cl.
*G06F 7/00* (2006.01)
*G06F 16/182* (2019.01)
*G06F 16/172* (2019.01)
*G06F 16/11* (2019.01)

(52) U.S. Cl.
CPC ........ *G06F 16/1827* (2019.01); *G06F 16/119* (2019.01); *G06F 16/122* (2019.01); *G06F 16/172* (2019.01)

(58) Field of Classification Search
CPC .. G06F 16/1827; G06F 16/172; G06F 16/119; G06F 16/122; G06F 16/178; G06F 16/27; G06F 16/275
See application file for complete search history.

(56) References Cited

U.S. PATENT DOCUMENTS

| 8,352,444 | B1 * | 1/2013 | Chang | G06F 16/93 707/694 |
| 9,613,064 | B1 * | 4/2017 | Chou | G06F 16/13 |
| 2010/0332401 | A1 * | 12/2010 | Prahlad | H04L 63/0428 705/80 |
| 2014/0006350 | A1 * | 1/2014 | Fukui | G06F 16/178 707/632 |
| 2014/0026181 | A1 * | 1/2014 | Kiang | G06Q 10/103 726/1 |
| 2014/0114672 | A1 * | 4/2014 | Wright | G16H 30/20 705/2 |
| 2014/0142984 | A1 * | 5/2014 | Wright | G06F 16/951 705/3 |
| 2014/0207486 | A1 * | 7/2014 | Carty | G06Q 10/10 705/2 |
| 2014/0258717 | A1 * | 9/2014 | Baek | H04L 63/0428 713/165 |
| 2014/0279879 | A1 * | 9/2014 | McLean | G06F 16/178 707/612 |

(Continued)

*Primary Examiner* — Mohammed R Uddin
(74) *Attorney, Agent, or Firm* — Fish & Richardson P.C.

(57) ABSTRACT

Methods, systems, and computer-readable storage media for determining, by an asset service executing on a server associated with the on-premise system, that a document has been added to the on-premise system, providing, within the cloud-based system, a temporary data object that stores data of the document, generating, within the cloud-based system, a persistent data object based on the temporary data object, the persistent data object storing data of the document, deleting the temporary data object, and associating a document identifier of the document to an asset identifier of the persistent data object within a repository of the on-premise system.

20 Claims, 5 Drawing Sheets

(56) References Cited

U.S. PATENT DOCUMENTS

| | | | |
|---|---|---|---|
| 2015/0006957 A1* | 1/2015 | Ginzinger | G06F 3/067 |
| | | | 714/15 |
| 2015/0100547 A1* | 4/2015 | Holmes-Higgin | ............ |
| | | | H04L 67/1095 |
| | | | 707/610 |
| 2015/0163206 A1* | 6/2015 | McCarthy | H04L 63/06 |
| | | | 713/171 |
| 2015/0169717 A1* | 6/2015 | Wang | G06F 16/27 |
| | | | 707/618 |
| 2015/0261782 A1* | 9/2015 | McFerrin | G06F 16/178 |
| | | | 707/625 |
| 2015/0281319 A1* | 10/2015 | Maturana | G06F 9/5072 |
| | | | 709/202 |
| 2016/0063026 A1* | 3/2016 | Mokhtarzada | G06F 16/10 |
| | | | 707/617 |
| 2016/0070717 A1* | 3/2016 | Bergner | G06F 16/178 |
| | | | 707/638 |
| 2016/0188700 A1* | 6/2016 | Kleinschnitz, Jr. | G06F 16/285 |
| | | | 707/692 |
| 2017/0075907 A1* | 3/2017 | Goswami | G06F 16/119 |
| 2018/0063143 A1* | 3/2018 | Wilson | H04L 67/32 |
| 2018/0121101 A1* | 5/2018 | Thind | G06F 3/0649 |
| 2018/0285529 A1* | 10/2018 | Ishikawa | G16H 10/60 |
| 2019/0080053 A1* | 3/2019 | Shiibashi | G06F 16/27 |
| 2019/0155870 A1* | 5/2019 | Prakash | G06F 40/197 |
| 2020/0089408 A1* | 3/2020 | Muthiah | G06F 3/064 |
| 2020/0210383 A1* | 7/2020 | Demaris | G06F 16/168 |

* cited by examiner

AUTOMATIC INTELLIGENT HYBRID BUSINESS INTELLIGENCE PLATFORM SERVICE

BACKGROUND

Enterprises conduct operations using software systems. Example software systems can include on-premise systems and cloud-based systems. In some examples, an on-premise system is operated locally to the enterprise, such as within a server system and network operated by the enterprise. In some examples, a cloud-based system is operated externally to the enterprise, such as within a server system and network operated by a third-party service provider on behalf of the enterprise. It often occurs that data and/or documents of an on-premise system are to be processed by a cloud-based system to provide some service for an enterprise. For example, data and documents are generated and stored within the on-premise system as a result of enterprise operations. The enterprise may provide the data and/or documents to the cloud-based system for provisioning of the service to the enterprise.

In such circumstances, numerous technical challenges arise. For example, data and/or documents may need to be transformed for use in the cloud-based system. As another example, pushing data and/or documents from the on-premise system to the cloud-based system is a time-consuming and resource-inefficient task. As still another example, synchronization is needed between the on-premise system and the cloud-based system to ensure that any updates and/or changes to the data and/or documents are consistent across the on-premise system and the cloud-based system. In short, coordination of data and/or documents between on-premise systems and cloud-based systems is inefficient and error-prone, which can result in corruption of data and/or documents.

SUMMARY

Implementations of the present disclosure are directed to an asset service (also referred to herein as an analytics hub asset service) that is provided within a processing server of the on-premise system, the asset service enabling push to and synchronization of data and/or documents with one or more cloud-based systems. More particularly, the asset service monitors changes to one or more documents (e.g., addition of a document, modification of a document, deletion of a document) within the on-premise system. In some implementations, in response to a change, the asset service provides an asset, updates an asset, or removes an asset from the one or more cloud-based systems.

In some implementations, actions include determining, by an asset service executing on a server associated with the on-premise system, that a document has been added to the on-premise system, providing, within the cloud-based system, a temporary data object that stores data of the document, generating, within the cloud-based system, a persistent data object based on the temporary data object, the persistent data object storing data of the document, deleting the temporary data object, and associating a document identifier of the document to an asset identifier of the persistent data object within a repository of the on-premise system. Other implementations of this aspect include corresponding systems, apparatus, and computer programs, configured to perform the actions of the methods, encoded on computer storage devices.

These and other implementations can each optionally include one or more of the following features: the document is periodically monitored for changes in response to the document being assigned to a specific category within the on-premise system; actions further include determining that the document has been updated in the on-premise system, and, in response, providing an updated asset within the cloud-based system; providing an updated asset within the cloud-based system includes providing, within the cloud-based system, a second temporary data object that stores updated data of the document, and updating the asset to include the updated data from the second temporary data object; actions further include determining that the document has been deleted from the on-premise system, and, in response, deleting the asset from the cloud-based system; actions further include determining that the document has been moved to a recycle bin within the on-premise system, and, in response, setting a status of the asset from a live status to a rest status within the cloud-based system; and actions further include periodically monitoring, by a crawler task of the asset service, a change status of documents within the on-premise system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
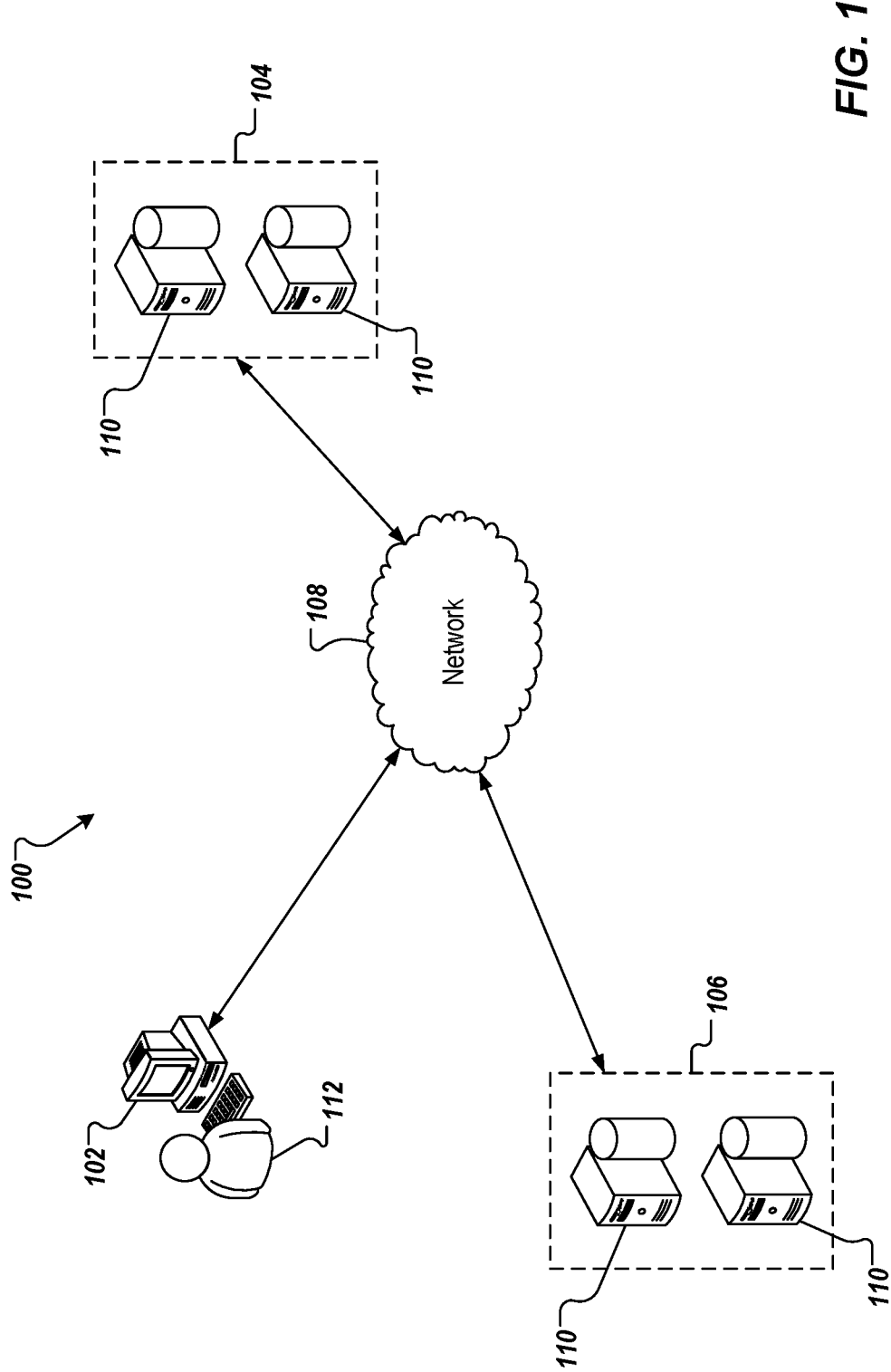
FIG. 1 depicts an example architecture that can be used to execute implementations of the present disclosure.

Implementations of the present disclosure are directed to an asset service (also referred to herein as an analytics hub asset service) that is provided within a processing server of the on-premise system, the asset service enabling push to and synchronization of data and/or documents with one or more cloud-based systems. More particularly, the asset service monitors changes to one or more documents (e.g., addition of a document, modification of a document, deletion of a document) within the on-premise system. In some implementations, in response to a change, the asset service provides an asset, updates an asset, or removes an asset from the one or more cloud-based systems.

Implementations can include actions of determining, by an asset service executing on a server associated with the on-premise system, that a document has been added to the on-premise system, providing, within the cloud-based system, a temporary data object that stores data of the document, generating, within the cloud-based system, a persistent data object based on the temporary data object, the persistent data object storing data of the document, deleting the temporary data object, and associating a document identifier of the document to an asset identifier of the persistent data object within a repository of the on-premise system.

Implementations of the present disclosure are described in further detail with reference to an example on-premise system and example cloud-based systems. The example on-premise system includes SAP Business Intelligence (BI) and the example cloud-based systems include SAP Analytics Cloud and SAP Analytics Hub, each of which are provided by SAP SE of Walldorf, Germany. SAP BI can be described as a centralized platform for querying, reporting, and visualization of enterprise data. SAP Analytics Cloud can be described as an all-in-one platform for business intelligence, planning, and predictive analytics to support enterprise operations. SAP Analytics Hub can be described as bringing together on-premise and cloud-based analytics assets in a single front-end platform, where SAP Analytics Cloud is the technological foundation and analytics platform for SAP Analytics Hub. It is contemplated, however, that implementations of the present disclosure can be realized in any appropriate on-premise system and/or cloud-based system.

To provide further context for implementations of the present disclosure, and as introduced above, enterprises conduct operations using software systems. Example software systems can include on-premise systems (e.g., SAP BI) and cloud-based systems (e.g., SAP Analytics Cloud, SAP Analytics Hub). In some examples, an on-premise system is operated locally to the enterprise, such as within a server system and network operated by the enterprise. In some examples, a cloud-based system is operated externally to the enterprise, such as within a server system and network operated by a third-party service provider (e.g., SAP SE) on behalf of the enterprise. It often occurs that data and/or documents of an on-premise system are to be processed by a cloud-based system to provide some service for an enterprise. For example, data and documents are generated and stored within the on-premise system as a result of enterprise operations. The enterprise may provide the data and/or documents to the cloud-based system for provisioning of the service to the enterprise.

In such circumstances, numerous technical challenges arise. For example, data and/or documents may need to be transformed for use in the cloud-based system. As another example, pushing data and/or documents from the on-premise system to the cloud-based system is a time-consuming and resource-inefficient task. As still another example, synchronization is needed between the on-premise system and the cloud-based system to ensure that any updates and/or changes to the data and/or documents are consistent across the on-premise system and the cloud-based system. In short, coordination of data and/or documents between on-premise systems and cloud-based systems is inefficient and error-prone, which can result in corruption of data and/or documents.

With reference to the example on-premise and cloud-based systems introduced above, one challenge for an administrator (e.g., employee/agent of the enterprise, who manages the on-premise system for the enterprise) is to transform on-premise data and/or reports between SAP BI and SAP Analytics Cloud/SAP Analytics Hub. Another challenge is to ensure synchronization on any update of the same documents between SAP BI and each of SAP Analytics Cloud and SAP Analytics Hub. Further, the administrator performs copying each document link (e.g., uniform resource locator (URL)) in the on-premise system and creating respective documents links in the cloud-based systems, which is time-consuming and resource-intensive. Further, a mechanism is absent to synchronize any updates or changes on the documents (e.g., delete metadata, modify metadata). For example, changes to a name and/or link of a document in the on-premise system needs to be updated to the corresponding document in the cloud-based system. Further, a mechanism is absent to identify creation of data and/or documents in the on-premise system and push newly created data and/or documents to the cloud-based systems.

Implementations of the present disclosure are directed to an asset service (also referred to herein as an analytics hub asset service) that is provided within a processing server of the on-premise system, the asset service enabling push to and synchronization of data and/or documents with one or more cloud-based systems. More particularly, the asset service monitors changes to one or more documents (e.g., addition of a document, modification of a document, deletion of a document) within the on-premise system. In some implementations, in response to a change, the asset service provides an asset, updates an asset, or removes an asset from the one or more cloud-based systems.

FIG. 1 depicts an example architecture 100 in accordance with implementations of the present disclosure. In the depicted example, the example architecture 100 includes a client device 102, a server system 104, a server system 106, and a network 108. The server systems 104, 106 each include one or more server devices and databases 110 (e.g., processors, memory). In the depicted example, a user 112 interacts with the client device 102.

In some examples, the client device 102 can communicate with the server systems 104, 106 over the network 108. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104, 106 each include at least one server and at least one data store. In the example of FIG. 1, the server systems 104, 106 are each intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host an on-premise system (e.g., SAP BI), and the server system 106 can host one or more cloud-based systems (e.g., SAP Analytics Cloud, SAP Analytics Hub). In some implementations, as part of the on-premise system, the server system 104 provides a hub asset service that enables push to and synchronization of data and/or documents with the cloud-based systems hosted by the server system 106. In some implementations, the server system 104 hosts an asset service that automatically coordinates push of documents to one or more cloud-based systems hosted on the server system 106 and that automatically synchronizes documents between the server system 104 and the server system 106.

Figure 2:
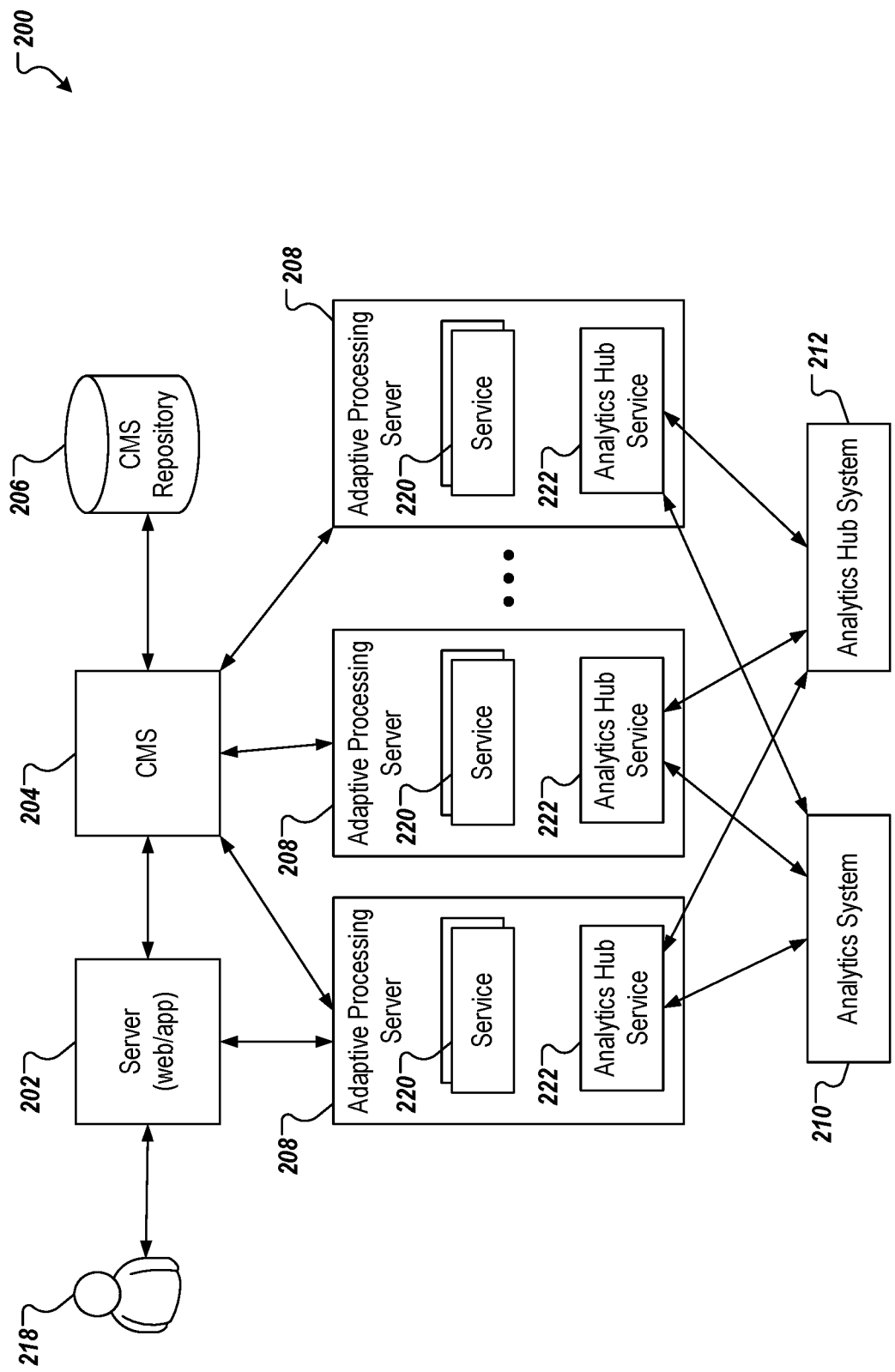
FIG. 2 depicts an example conceptual architecture that can be used to execute implementations of the present disclosure.

FIG. 2 depicts an example conceptual architecture 200 in accordance with implementations of the present disclosure. In the depicted example, the example conceptual architecture 200 includes a server 202, a change management service (CMS) 204, a CMS repository 206, a plurality of adaptive processing servers (APSs) 208, an analytics system 210 (e.g., SAP Analytics Cloud), and an analytics hub (AH) system 212 (e.g., SAP Analytics Hub). Although a plurality of APSs 208 is depicted, implementations of the present disclosure can be realized using any appropriate number of APSs 208. Further, although the server 202 is depicted as communicating with a single APS 208, it is contemplated that the server 202 can communicate with each of the APSs 208. By way of non-limiting example, the CMS 204 can be provided as SAP CMS, which is provided as part of the SAP Net Weaver Development Infrastructure (NWDI) provided by SAP SE of Walldorf, Germany. In some examples, the CMS enables configuration of transport landscapes and managing the transport of objects (e.g., Java development objects) between different systems.

In some implementations, the server 202 (e.g., a web server, an application server) hosts one or more channels that enables a user 218 to interface with an on-premise system to create and manage data and/or reports that are synchronized with one or more of the analytics system 210 and the analytics hub system 212. In some examples, each of the one or more channels is provided as an application or a web application. In some examples, each channel is provided as an interface, through which the user 218 interfaces with the on-premise system and/or one or more of the analytics system 210 and the analytics hub system 212. Example interfaces can include, without limitation, BI Launchpad provided with SAP BI, a Web Intelligence (Webi) interface, and a central management console (CMC) interface.

In some implementations, each APS 208 hosts one or more services 220. Example services 220 include, without limitation, a mobile service (e.g., enabling documents to be accessed using a mobile device), a commentary service (e.g., enabling users to add comments to documents), and a platform search service. In accordance with implementations of the present disclosure, and as described in further detail herein with reference to FIG. 3, each APS 208 hosts an analytics hub service 222 (also referred to herein as an asset service). The analytics hub service 222 functions as an automated interface between the on-premise system and each of the cloud-based systems (e.g., the analytics system 210 and the analytics hub system 212) to push documents to the cloud-based systems and synchronize documents between the on-premise system and the cloud-based systems.

More particularly, and as described in further detail herein, the user 218 can generate a document (e.g., a report) using the on-premise system, which document is stored in the CMS repository 206. In some implementations, each document can be associated with one or more categories. In accordance with implementations of the present disclosure, an asset hub category is provided and indicates documents that are to be pushed to and synchronized with the cloud-based systems. In some implementations, in response to a document being assigned to the asset hub category within the on-premise system, an asset corresponding to the document is provided in the cloud-based system. In some examples, the asset provided in the cloud-based systems is populated with metadata of the document from the on-premise system.

In some implementations, the analytics hub service 222 monitors changes to the document within the on-premise system and initiates respective changes within the cloud-based system. In some examples, the analytics hub service 222 periodically checks the CMS 204 to determine whether any changes have been made to documents assigned to the asset hub category. Example changes can include, without limitation, a change in name, a change in title, a change in description, and a change in link (e.g., URL). If a change has been made to a document that is assigned to the asset hub category, the change is automatically synchronized in the cloud-based system. For example, and as described in further detail herein, an asset corresponding to the document is provided in the cloud-based system, and the asset previously stored in the cloud-based system for the document is deleted. In some examples, the change can include de-assigning the document from the asset hub category. In response, the asset corresponding to the document is deleted from the cloud-based system.

Figure 3:
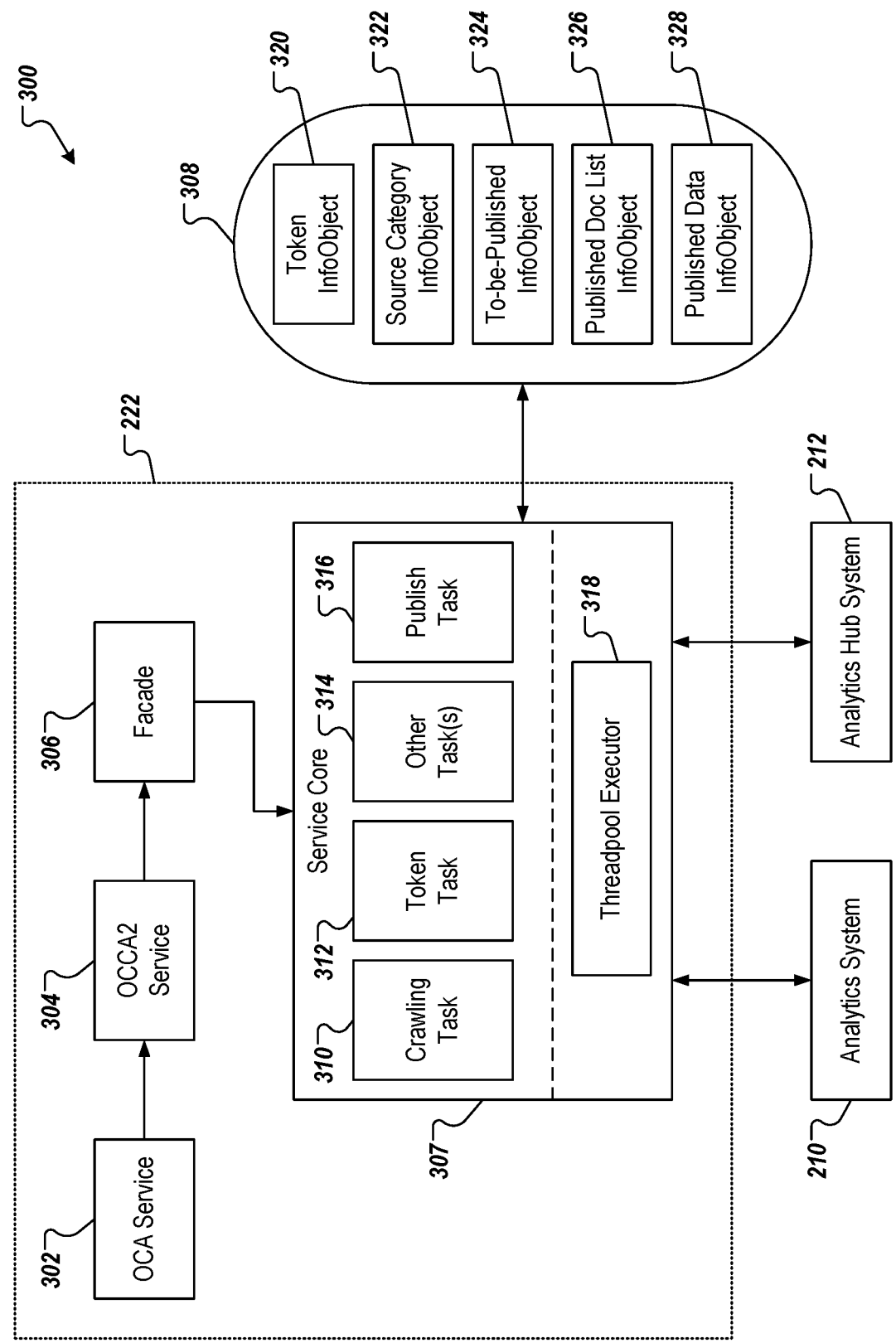
FIG. 3 depicts details of an example analytics hub service in accordance with implementations of the present disclosure.

FIG. 3 depicts details of the example analytics hub service 222 in accordance with implementations of the present disclosure. In the example of FIG. 3, a conceptual architecture includes the analytics hub service 222, the analytics system 210, and the analytics hub system 212. In some implementations, the analytics hub service 222 includes an OCA service 302, an OCCA2 service 304, a facade 306, and a service core 307 that communicates with a repository 308. In some examples, the repository 308 is provided as the CMS repository 206 of FIG. 2. In some implementations, an application executing on the server 202 of FIG. 2 communicates directly with the service core 307. In some examples, an application executing on the server 202 of FIG. 2 (e.g., a web application) communicates with the service core 307 through the OCA service 302, the OCCA2 service 304, and the facade 306.

In some implementations, the service core 307 executes a set of tasks. For example, a thread pool manager can be provided (not depicted) that manages different thread pool executors 318 and their configurations. In some examples, each thread pool executor 318 executes one or more tasks.

In the example of FIG. 2, the set of tasks includes a crawler task 310, a token task 312, one or more other tasks 314, and a publish task 316.

In some implementations, the crawler task 310 is executed to identify changes to documents within the CMS repository 206. That is, the crawler task 310 identifies changes to documents that are assigned to the asset hub category. In some examples, documents assigned to the asset hub category are identified (e.g., based on a document identifier (doc_id)) in a source category InfoObject 322 stored in the repository 308. For example, the crawler task 310 cross-references the source category InfoObject 322 to determine documents that are assigned to the asset hub category and then check the status of the documents as to whether any have had a change. Example changes includes, without limitation, newly added documents, updated documents, deleted documents, moved to recycle bin documents, restored documents and any update occurring on an Open-Document URL.

In some examples, in response to identifying a new document, a temporary data object, also referred to as a draft, is provided. In some examples, the temporary data object is populated with metadata associated with the document (e.g., name, title, description, URL). In some examples, the temporary data object is provided in Javascript object notation (JSON). In some examples, the temporary data object (including the document data) is stored as a to-be published InfoObject 324 within the repository 308.

In some implementations, the token task 312 retrieves an authentication token from the analytics system 210. In some examples, the authentication token is used by the publish task 316 to publish the documents (assets) to the analytics hub system 212. For example, the analytics system 210 provides the authentication token based on credentials. In some examples, the analytics system 210 executes an authentication protocol (e.g., open authentication (OAuth) based on the credentials and, if the credentials are authenticated, provides the authentication token. The authentication token is then used to access the analytics hub system 212. In some examples, the authentication token is (temporarily) stored in the repository 308 within the token InfoObject 320.

In some implementations, if a draft is approved, the draft is published to the analytics hub system 212 as an asset. In some examples, the asset can be described as a document (e.g., a persisted data object). In some examples, the asset is assigned an asset identifier (asset_id) that uniquely identifies the asset among a set of assets stored in the analytics hub system 212. In some examples, a document of the on-premise system is associated with a respective asset using the asset_id of the asset. In some examples, documents that are represented the analytics hub system 212 through a published are recorded (e.g., based on doc_id) in a published document list InfoObject 326. In some examples, assets that have been published to the analytics hub service 212 are recorded (e.g., based on asset_id) in a published data InfoObject 328.

In further detail, the publish task 316 reads data from the to-be-published InfoObject 326 and adds the data to a processing queue. In some examples, a number of rows of data to be added is already configured. The publish task 316 publish data (e.g., row-by-row) to the analytics hub system 212 and adds published row data to a published data InfoObject 328. The publish task 316 also adds published row data to the published document list InfoObject 326 and deletes the data from the processing queue.

In some implementations, if the crawler task 310 determines that a document has been modified, the crawler task 310 determines whether the document is already represented in the analytics hub system 212. For example, the crawler task 310 cross-references (e.g., based on doc_id) the published document list InfoObject 326 to determine whether the document is already represented in the analytics hub system 212. If the document is not already been represented in the analytics hub system 212 (i.e., by a respective asset), a draft (then asset) is created in analytics hub system 212, as described herein.

If the document is already represented in the analytics hub system 212, the asset corresponding to the document is to be updated. In some examples, the asset_id of the asset corresponding to the document is determined by the crawler task 310 by cross-referencing the published data InfoObject 328. In some examples, the asset is accessed within the analytics hub system 212 with reference to the asset_id and using the authentication token.

In some implementations, it can be determined whether the document was deleted or moved to a recycle bin within the on-premise system. That is, for example, the crawler task 310 checks the status of the document (based on doc_id) within the on-premise system and can receive an indication that the document was deleted or moved to a recycle bin within the on-premise system. If the document was deleted and is already represented in the hub analytics system 212 (i.e., an asset corresponding to the document exists in the hub analytics system 212), the asset is deleted from the hub analytics system 212. Further, the corresponding data is deleted from each of the published doc list InfoObject 326 and the published data InfoObject 328. For example, in response to determining that the document is deleted from the on-premise system (i.e., the change is a permanent delete), a request for a status of the respective asset (based on asset_id) that is to be deleted is sent to the analytics hub system 212. If the asset is in a live status, then a retire asset request is sent to the analytics hub system 212 to put the asset into a rest status. After a response is received from the analytics hub system 212 that the asset is in the rest status, a delete retired asset request is sent to the analytics hub system 212. If the asset is already in the retire status, then a direct delete asset request will be sent to delete the asset.

If the document was moved to the recycle bin and is already represented in the hub analytics system 212 (i.e., an asset corresponding to the document exists in the hub analytics system 212), the asset is moved to a rest status within the hub analytics system 212. In this manner, the asset can be moved to the status, if the document is subsequently removed from the recycle bin (without being deleted) in the on-premise system). In further detail, a request for the status of the asset (based on asset_id) that is to be deleted is sent to the analytics hub system 212. If the asset is in the live status, then a retire asset request is sent to the analytics hub system 212.

In some implementations, and as described herein, the change in a document results in an update to the respective asset within the analytics hub system 212. For example, if one or more of the name, title, description, and URL of a document changes, the corresponding data is updated in the respective asset within the analytics hub system 212. In further detail, in response to a request to update an asset, the analytics hub system 212: retrieves details of the asset, creates a draft using the asset_id of the asset, updates the draft with the changed data, waits for validation of the draft, and in response to validation, saves the asset and deletes the draft.

Figure 4:
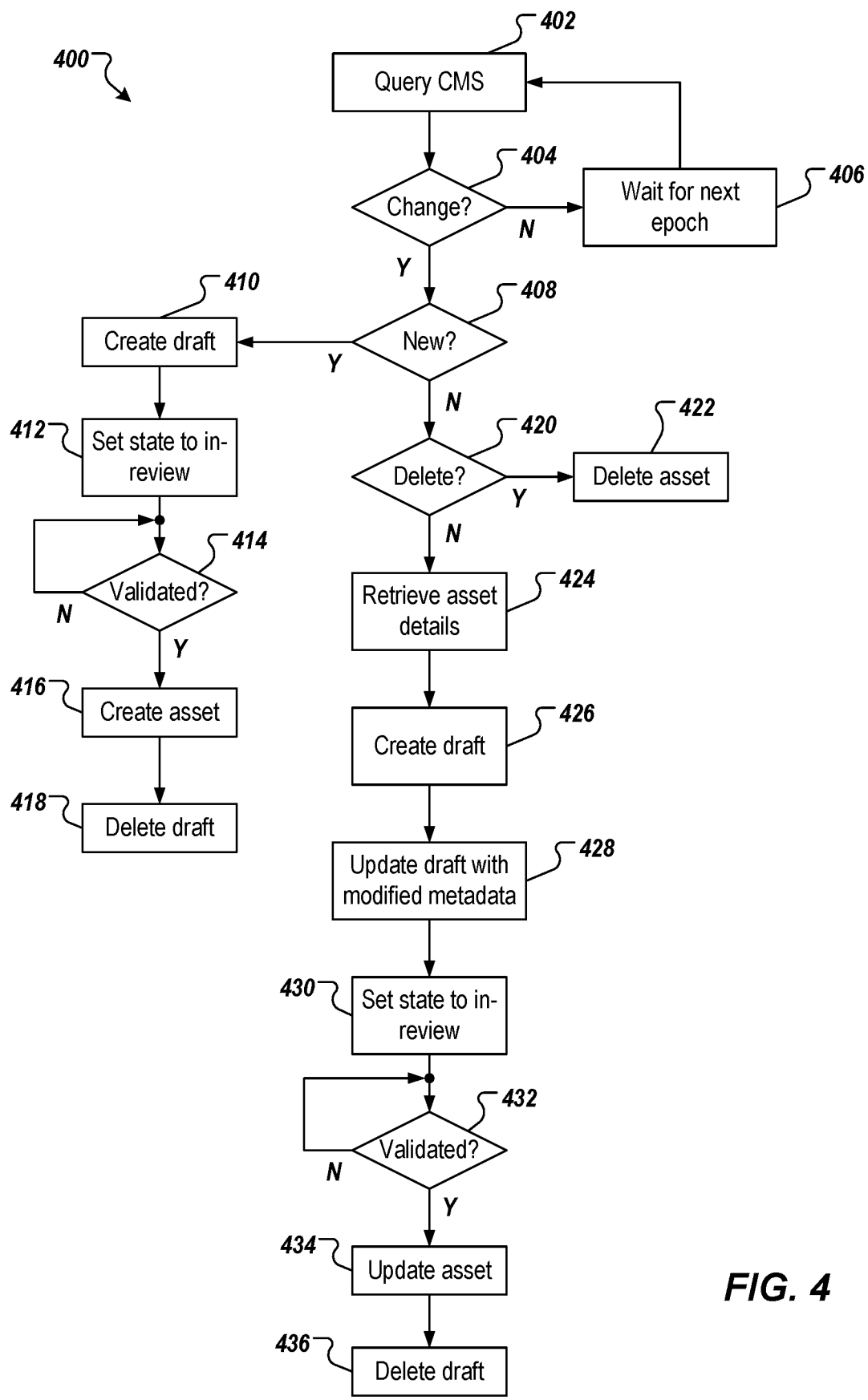
FIG. 4 depicts an example process that can be executed in accordance with implementations of the present disclosure.

FIG. 4 depicts an example process that can be executed in accordance with implementations of the present disclosure. In some examples, the example process 400 is provided using one or more computer-executable programs executed by one or more computing devices.

An on-premise system is queried (402). For example, and as described in detail herein, the crawler task 310 of (FIG. 3) the analytics hub service 222 (FIGS. 2 and 3) periodically queries a change status of a set of documents within the CMS system 204. In some examples, the set of documents includes documents that have been assigned to an asset hub category. In some examples, the set of documents is determined from the source category InfoObject 320, which records one or more categories assigned to each document of the on-premise system. It is determined whether a change has occurred in a document (404). For example, a change status of each document in the set of documents is provided, each change status indicating whether a respective document has changed since a last time the change status was queried. If there are no changes to any of the documents in the set of documents, a wait for next epoch occurs (406). For example, the crawler task 310 waits for another period and, upon expiration of the period, the example process 300 loops back.

If there is a change to a document, it is determined whether the change indicates a document that has been added to the on-premise system (408). If the change indicates a document that has been added to the on-premise system, a draft is created (410), a status of the draft is set to in-review (412), and it is determined whether the draft has been validated (414). For example, in response to creation of the draft, a request can be sent for validation of the draft. In some examples, a user (e.g., an administrator) reviews the data recorded in the draft and selectively validates the draft. If the draft is validated, an asset is created (416). For example, and as described in detail herein, the asset is created within the analytics hub system 212, is populated with the data of the document from the draft, and is assigned a unique asst_id. The draft is deleted (418).

If the change does not indicate that a document has been added to the on-premise system, it is determined whether the change indicates that a document has been deleted (420). For example, it can be determined whether the change indicates a permanent delete, or a move to recycle bin, as described herein. If the change indicates that a document has been permanently deleted or moved to the recycle bin, the asset corresponding to the document is either deleted or set to a rest status (422).

If the change does not indicate that a document has been permanently deleted or moved to the recycle bin, the document has been updated. Consequently, the asset details are retrieved (424) and a draft is created (426). The draft is updated with the changed data of the document (428). A status of the draft is set to in-review (430), and it is determined whether the draft has been validated (432). For example, in response to creation of the draft, a request can be sent for validation of the draft. In some examples, a user (e.g., an administrator) reviews the data recorded in the draft and selectively validates the draft. If the draft is validated, an asset is updated (434). For example, the asset is updated to include the modified data and maintains the same asset_id. The draft is deleted (436).

Figure 5:
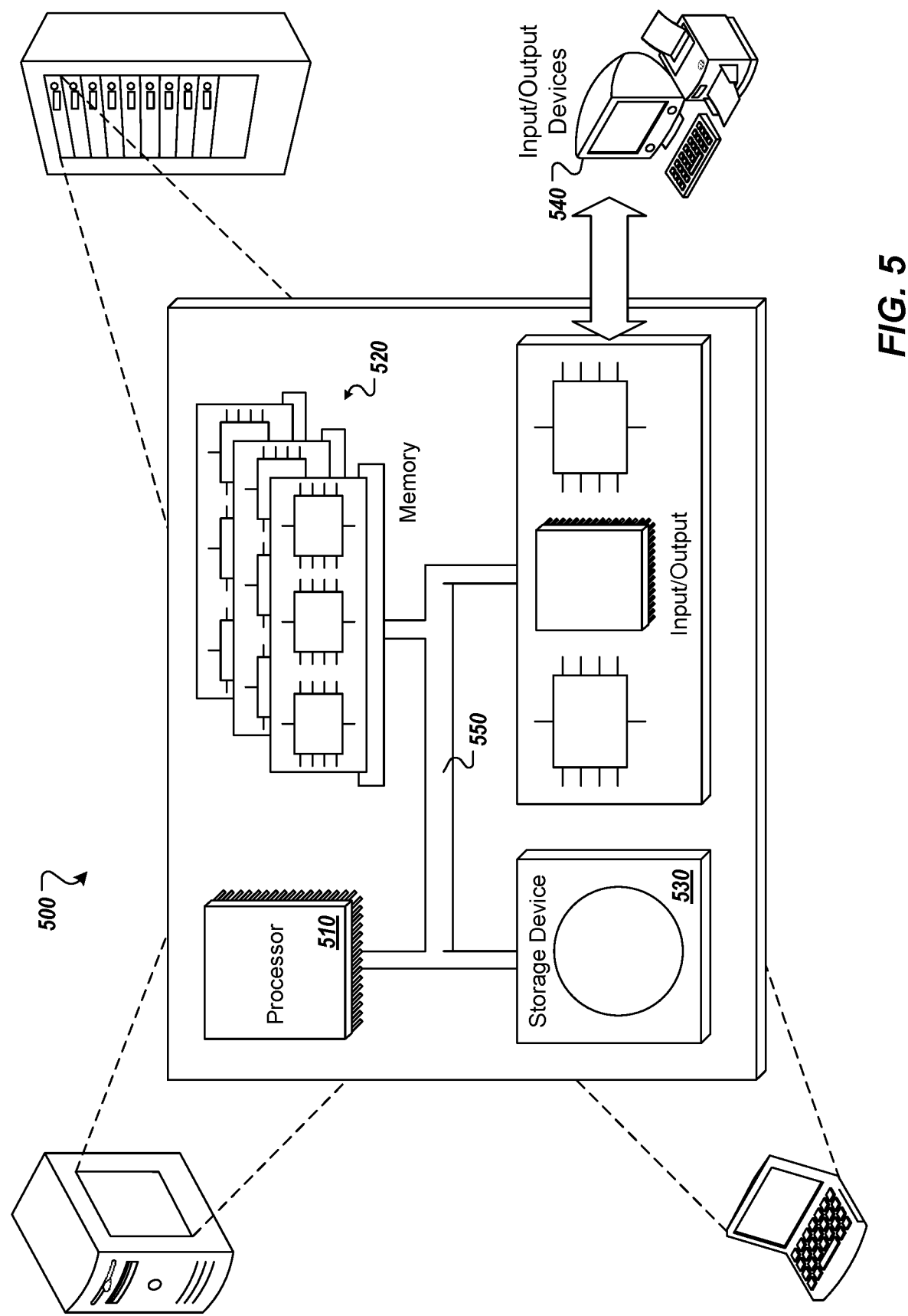
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for synchronizing between an on-premise system and a cloud-based system, the method being executed by one or more processors and comprising:
   determining, by an asset service executing on a server associated with the on-premise system, that a document has been added to the on-premise system;
   providing, within the cloud-based system, a temporary data object that stores data of the document, in response to determining that the document is assigned to a specific category of a set of categories within the on-premise system;
   generating, within the cloud-based system, a persistent data object based on the temporary data object, the persistent data object storing data of the document;
   deleting the temporary data object; and
   associating a document identifier of the document to an asset identifier of the persistent data object within a repository of the on-premise system, the assert identifier being stored in a published document list information object within the repository, the document identifier being stored in a source category information object for access by a crawler task of the asset service to determine subsequent changes being made to the document within the on-premise system, the crawler task being executed within the server to communicate with the on-premise system, subsequent changes being determined by the crawler task at least partially by cross-referencing with the source category information object to obtain the document identifier and checking a status of the document within the on-premise system based on the document identifier.

2. The method of claim 1, wherein the document is periodically monitored for changes in response to the document being assigned to the specific category within the on-premise system.

3. The method of claim 1, further comprising determining that the document has been updated in the on-premise system, and, in response, providing an updated asset within the cloud-based system.

4. The method of claim 3, wherein providing an updated asset within the cloud-based system comprises providing, within the cloud-based system, a second temporary data object that stores updated data of the document, and updating the asset to include the updated data from the second temporary data object.

5. The method of claim 1, further comprising determining that the document has been deleted from the on-premise system, and, in response, deleting the asset from the cloud-based system.

6. The method of claim 1, further comprising determining that the document has been moved to a recycle bin within the on-premise system, and, in response, setting a status of the asset from a live status to a rest status within the cloud-based system.

7. The method of claim 1, further comprising periodically monitoring, by the crawler task of the asset service, a change status of documents within the on-premise system.

8. A non-transitory computer-readable storage medium coupled to one or more processors and having instructions stored thereon which, when executed by the one or more processors, cause the one or more processors to perform operations for synchronizing between an on-premise system and a cloud-based system, the operations comprising:
   determining, by an asset service executing on a server associated with the on-premise system, that a document has been added to the on-premise system;
   providing, within the cloud-based system, a temporary data object that stores data of the document, in response to determining that the document is assigned to a specific category of a set of categories within the on-premise system;
   generating, within the cloud-based system, a persistent data object based on the temporary data object, the persistent data object storing data of the document;
   deleting the temporary data object; and
   associating a document identifier of the document to an asset identifier of the persistent data object within a repository of the on-premise system, the assert identifier being stored in a published document list information object within the repository, the document identifier being stored in a source category information object for access by a crawler task of the asset service to determine subsequent changes being made to the document within the on-premise system, the crawler task being executed within the server to communicate with the on-premise system, subsequent changes being determined by the crawler task at least partially by cross-referencing with the source category information object to obtain the document identifier and checking a status of the document within the on-premise system based on the document identifier.

9. The computer-readable storage medium of claim 8, wherein the document is periodically monitored for changes in response to the document being assigned to the specific category within the on-premise system.

10. The computer-readable storage medium of claim 8, wherein operations further comprise determining that the document has been updated in the on-premise system, and, in response, providing an updated asset within the cloud-based system.

11. The computer-readable storage medium of claim 10, wherein providing an updated asset within the cloud-based system comprises providing, within the cloud-based system, a second temporary data object that stores updated data of the document, and updating the asset to include the updated data from the second temporary data object.

12. The computer-readable storage medium of claim 8, wherein operations further comprise determining that the document has been deleted from the on-premise system, and, in response, deleting the asset from the cloud-based system.

13. The computer-readable storage medium of claim 8, wherein operations further comprise determining that the document has been moved to a recycle bin within the on-premise system, and, in response, setting a status of the asset from a live status to a rest status within the cloud-based system.

14. The computer-readable storage medium of claim 8, wherein operations further comprise periodically monitoring, by the crawler task of the asset service, a change status of documents within the on-premise system.

15. A system, comprising:
a computing device; and
a computer-readable storage device coupled to the computing device and having instructions stored thereon which, when executed by the computing device, cause the computing device to perform operations for natural language explanations for synchronizing between an on-premise system and a cloud-based system, the operations comprising:
  determining, by an asset service executing on a server associated with the on-premise system, that a document has been added to the on-premise system;
  providing, within the cloud-based system, a temporary data object that stores data of the document, in response to determining that the document is assigned to a specific category of a set of categories within the on-premise system;
  generating, within the cloud-based system, a persistent data object based on the temporary data object, the persistent data object storing data of the document;
  deleting the temporary data object; and
  associating a document identifier of the document to an asset identifier of the persistent data object within a repository of the on-premise system, the assert identifier being stored in a published document list information object within the repository, the document identifier being stored in a source category information object for access by a crawler task of the asset service to determine subsequent changes being made to the document within the on-premise system, the crawler task being executed within the server to communicate with the on-premise system, subsequent changes being determined by the crawler task at least partially by cross-referencing with the source category information object to obtain the document identifier and checking a status of the document within the on-premise system based on the document identifier.

16. The system of claim 15, wherein the document is periodically monitored for changes in response to the document being assigned to the specific category within the on-premise system.

17. The system of claim 15, wherein operations further comprise determining that the document has been updated in the on-premise system, and, in response, providing an updated asset within the cloud-based system.

18. The system of claim 17, wherein providing an updated asset within the cloud-based system comprises providing, within the cloud-based system, a second temporary data object that stores updated data of the document, and updating the asset to include the updated data from the second temporary data object.

19. The system of claim 15, wherein operations further comprise determining that the document has been deleted from the on-premise system, and, in response, deleting the asset from the cloud-based system.

20. The system of claim 15, wherein operations further comprise determining that the document has been moved to a recycle bin within the on-premise system, and, in response, setting a status of the asset from a live status to a rest status within the cloud-based system.

\* \* \* \* \*